May 3, 1932.  W. L. FRY  1,856,868
SEAT SIDE ARM COVER
Filed Nov. 12, 1928  3 Sheets-Sheet 1
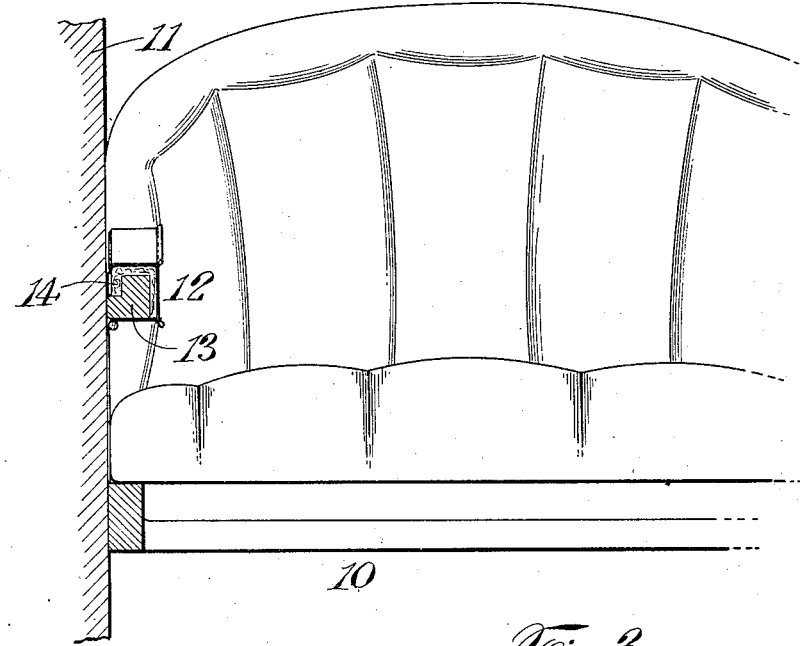
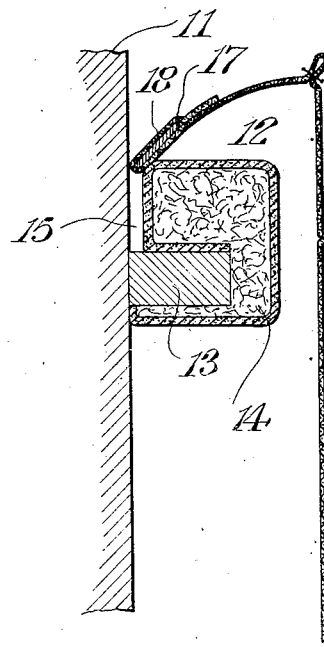
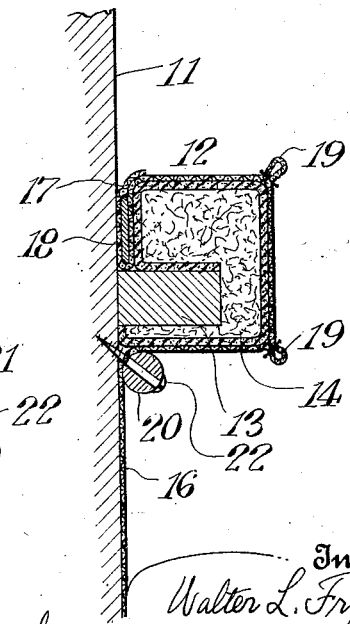
Inventor,
Walter L. Fry.
By his Attorneys.
Hoguet & Neary May 3, 1932. W. L. FRY 1,856,868
SEAT SIDE ARM COVER
Filed Nov. 12, 1928  3 Sheets-Sheet 2
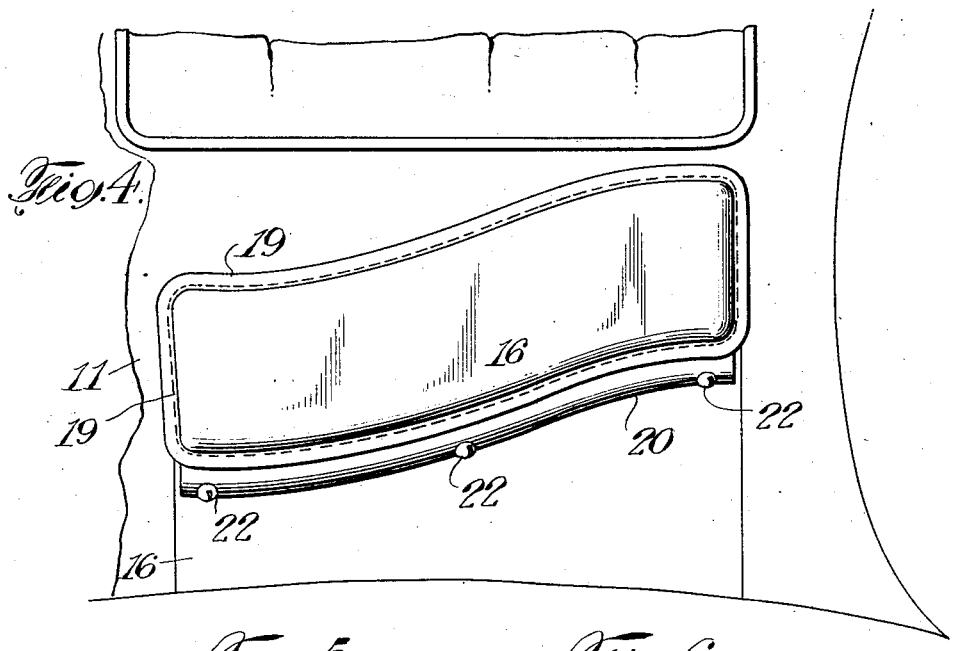
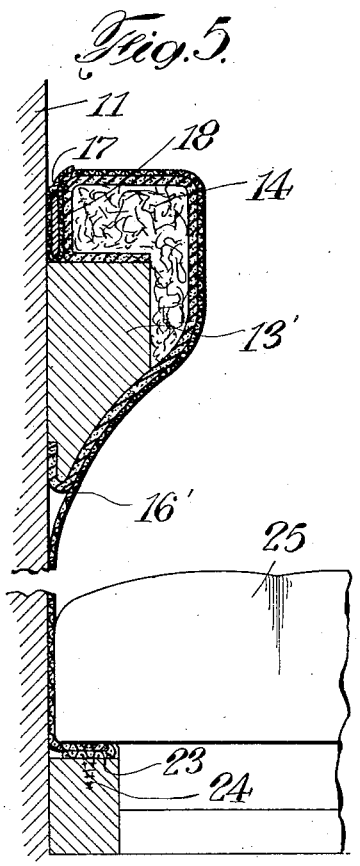
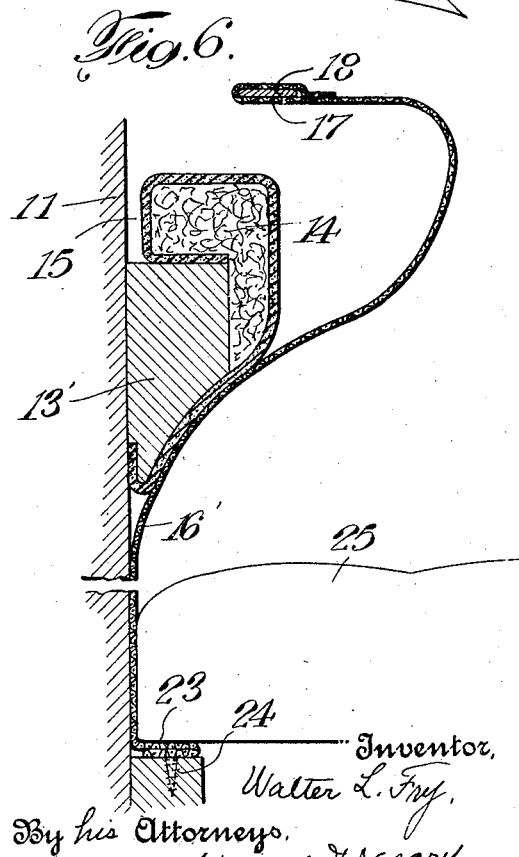
Inventor,
Walter L. Fry,
By his Attorneys.
Hoguet & Neary.

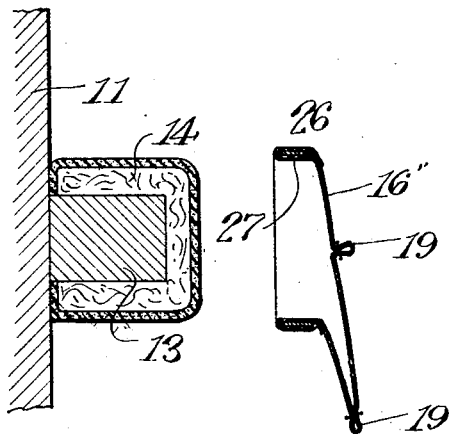
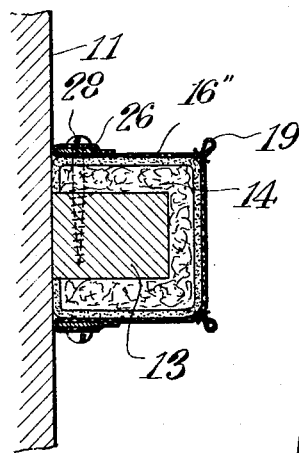
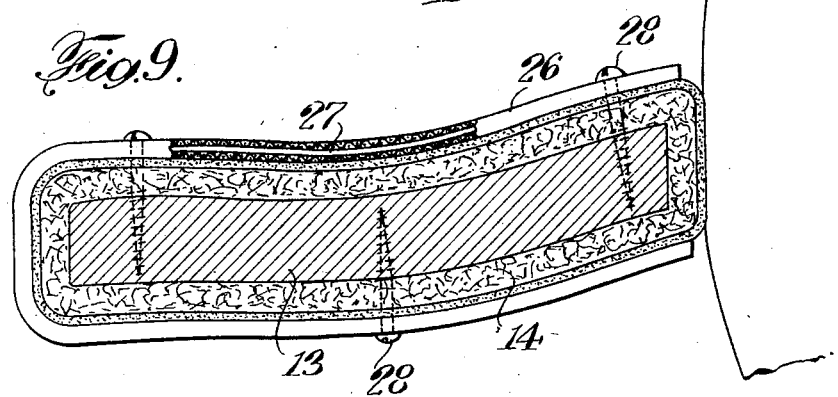
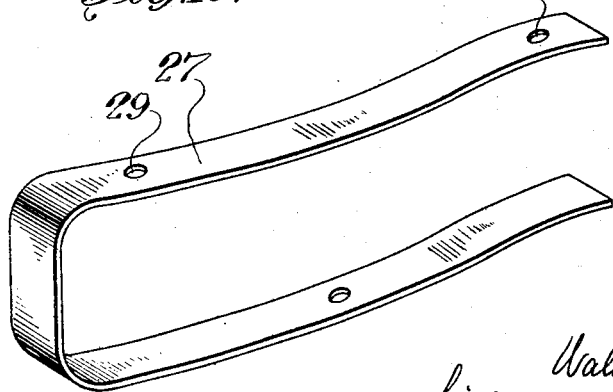

Patented May 3, 1932

1,856,868

UNITED STATES PATENT OFFICE

WALTER L. FRY, OF SCARSDALE, NEW YORK, ASSIGNOR, BY MESNE ASSIGNMENTS, TO WIL-FRY CORPORATION, OF NEW YORK, N. Y., A CORPORATION OF DELAWARE

SEAT SIDE ARM COVER

Application filed November 12, 1928. Serial No. 318,647.

My invention relates to improvements in removable or so-called slip covers for the side arms of seats, and particularly for the side arms of car seats. As is well known, it is a general practice to provide slip covers for car seats and to make the cover for a side arm so that it can be easily applied or removed and will fit nicely thereon is very difficult. It is important that the side arm be covered because it is subject to a good deal of wear and because of its prominence it is desirable that the cover may be handsome and lie smoothly.

The object of my invention is to produce a side arm cover which can easily be adapted to various forms of side arms and, as stated, especially for the side arms of motor car seats, and also to provide means for firmly, but detachably, securing the cover in place.

It will be understood that while I have shown and described a cover suitable for the side arms illustrated in the accompanying drawings the invention includes many variations in shape because the side arms of various cars and seats differ greatly in design.

Further objects and advantages will appear from the following description and drawings in which similar reference characters refer to similar parts throughout the various views.

Fig. 1 is a general front view of a car seat with the side arm in section and my improved cover applied;

Fig. 2 is an enlarged cross section of the side arm with the cover slightly removed and in position to be applied;

Fig. 3 is a view similar to Fig. 2 but with the cover in position;

Fig. 4 is an inside elevation of the side arm and cover with the latter applied;

Fig. 5 is a cross section through the side arm showing a slightly modified type of cover adapted to a different shape of side arm;

Fig. 6 is a view similar to Fig. 5 but showing the cover partly removed;

Fig. 7 is a cross section of another form of side arm and correspondingly modified cover with the cover removed;

Fig. 8 is a view similar to Fig. 7 but with the cover for the side arm applied;

Fig. 9 is a vertical longitudinal section through the side arm with parts of the cover portion broken away; and Fig. 10 is a detail of the reinforcing strip forming a part of the structure shown in Fig. 9.

As illustrated in Figs. 1 to 4, the car seat 10 may be of any usual character and it is illustrated in connection with the adjacent side 11 of the car, and with a rather conventional side arm 12.

The latter has a rigid core 13 upon which the upholstering 14 is placed and both the core and the upholstering vary with different makes of cars and with different designs of the same make. Quite frequently, however, these side arms have a little space 15 between the upper part of the upholstery and the adjacent side of the car. This is rather exaggerated in the drawings and in the actual car it usually appears and is not much more than a crack but it exists and a reinforcing and fastening means can be wedged or pushed down into this space because the upholstery will give sufficiently to permit it.

The cover 16 of any suitable fabric is adapted to envelope the exposed part of the side arm and with the type of side arm shown in the figures referred to it is provided with a reinforced upper edge adapted to be pushed into the space 15. Such reinforcement can be, most conveniently, a hem 17 with a stiffening rod or member 18 therein. Obviously this stiffening element can be otherwise associated with the upper edge of the cover and it can be any stiffening means which will permit the said edge to be forced into the space 15.

The upper, lower and front corners of the side arm cover are preferably reinforced or stiffened in some manner to prevent wear and to better define the shape of the cover so that it will stay in place better and make the corners more durable, as these are the most exposed.

This corner reinforcement might be a binding, or it can conveniently be secured by making a hem 19 at the exposed parts, which is shown in Fig. 4, extend entirely around the side arm, but if one part or inner end of the side arm would be of such a character to prevent such reinforcement, it will of course be absent. The side arm illustrated in Figs. 1–4 is essentially rectangular in cross section and therefore the cover on the under side of the side arm is pushed up snugly in place and secured by a clamping member 20 which can be a rod of the contour of the under side of the side arm and the clamping member can be secured in any convenient way. A good way is illustrated in which the member is pierced with holes 21 through which extend fastening elements 22 which engage into the adjacent side of the car, or other support which may be present at this point. The lower part of the cover extends downward and can be secured in any way, as for example the way presently described and illustrated in Figs. 5 and 6.

In Figs. 5 and 6 a slightly different form of side arm is used in which the core or rigid part 13' tapers downwardly on the under side and of course the arm as a whole is correspondingly shaped. In this case the clamping member 20 can be dispensed with and in the figures referred to I have shown the cover left smooth at the corners without the reinforcing 19 above described. In a structure of this shape the bar or clamping member 20 can be omitted and the cover will rather closely follow the curve of the under side of the arm.

The cover 16' illustrated in these figures has the same reinforcement at its upper edge and its lower edge can be doubled over as at 23 if desired, or can be left without reinforcement and is secured by a fastening means 24 beneath the seat cushion 25.

In Figs. 7 to 10 I have shown another type of side arm and with the cover correspondingly modified to meet the conditions of such a change. Here the side arm has no space left between the upper part of the upholstery and the side of the car 11, consequently the cover 16" has to be correspondingly modified, but as in the other cases, it has reinforcing and securing means at its inner edge. As here illustrated, a hem 26 extends around the top front and down the sides of the cover at its inner edge and in it is placed a stiffening element 27 which can be, conveniently, a metallic strap or strip, and which is shaped to the contour of the arm. It is illustrated as having holes 29 through which the screws 28 may pass to fasten it, and the cover connected therewith, in position. The cover 16" in this instance is shown as fitting snugly upon the side arm and this type of cover has preferably the reinforced corner part 19.

The several illustrations which I have made show that my invention comprises a cover which will fit smoothly upon a side arm so as to cover all exposed parts, that it has reinforcing and securing means at the parts adjacent the outer edge of the side arm, and that the details of supporting and fastening the cover must, of necessity, vary with the different types and sizes of side arms, but the principle which I have illustrated is easily applicable to these various arms.

What I claim is:

1. A slip cover for the side arm of a car seat, shaped to envelope the side arm, having a stiffened upper edge fitting snugly between the arm and car wall to bind the cover at said parts, and reinforcing and shaping parts disposed to come opposite the exposed corners of the side arm.

2. A slip cover for the side arm of a motor car seat, shaped to envelope the side arm, and having reinforcing and detachable securing means at points adapted to come at the junction of the upper and lower parts of the side arm with the adjacent car side and to substantially follow the contour of said junction parts, said upper securing means comprising a stiffened cover edge shaped to be pushed between the side arm and car wall and be thereby bound.

3. A slip cover for the side arm of a car seat, shaped to envelope the said side arm, having a stiffened upper edge to fit and be frictionally bound between the side arm and a part of the car, and a separate clamping member to secure the under part of the cover to the side arm.

4. A slip cover for the side arm of a car seat, shaped to envelope the said side arm, and stiffening and reinforcing means associated with the upper and under side of the cover adjacent the junction with the side of the car and adapted to detachably secure the cover in position on the side arm, said upper securing means comprising a stiffened cover edge adapted to fit and be frictionally bound between the side arm and the car wall.

5. A slip cover for the side arm of a car seat shaped to envelope the side arm having a stiffened upper edge shaped to fit and be frictionally bound between the side arm and a part of the car, and means for fastening the cover below the side arm and near the junction of the side arm and the adjacent part of the car.

6. A slip cover for the side arm of a car seat shaped to envelope the side arm having reinforcing and securing means to attach it to the side arm on the upper and lower parts of said arm and near the junction of the arm and the adjacent wall, said upper means comprising a stiffening element at the cover edge frictionally held between the side arm and car wall, said cover having reinforcing parts following the contour of the arm and disposed to lie opposite the greatest wearing parts of the side arm.

In testimony whereof, I have signed my name to this specification this 31st day of October, 1928.

WALTER L. FRY.